(12) United States Patent
Whittenberger et al.

(10) Patent No.: US 7,501,102 B2
(45) Date of Patent: Mar. 10, 2009

(54) REACTOR HAVING IMPROVED HEAT TRANSFER

(75) Inventors: William A. Whittenberger, Leavittsburg, OH (US); David A. Becker, Hiram, OH (US); Sudipta Chattopadhyay, Columbiana, OH (US); L. Amanda Suffecool, Wayland, OH (US)

(73) Assignee: Catacel Corp., Garrettsville, OH (US)

( * ) Notice: Subject to any disclaimer, the term of this patent is extended or adjusted under 35 U.S.C. 154(b) by 644 days.

(21) Appl. No.: 11/191,683

(22) Filed: Jul. 28, 2005

(65) Prior Publication Data

US 2007/0025893 A1    Feb. 1, 2007

(51) Int. Cl.
| F28D 21/00 | (2006.01) |
| B01D 50/00 | (2006.01) |
| B32B 3/12 | (2006.01) |
| B32B 3/20 | (2006.01) |
| B21D 39/00 | (2006.01) |

(52) U.S. Cl. .................. 422/205; 422/177; 422/178; 422/179; 422/180; 422/181; 422/182; 428/116; 428/188; 428/593

(58) Field of Classification Search ......... 422/177–182, 422/205, 311; 428/116, 188, 593; 502/527, 502/439
See application file for complete search history.

(56) References Cited

U.S. PATENT DOCUMENTS

| 4,162,290 A | 7/1979 | Crawford |
| 4,316,499 A | 2/1982 | Schlageter |
| 4,400,309 A | 8/1983 | McMahon |
| 4,713,234 A | 12/1987 | Weirich |
| 4,830,834 A | 5/1989 | Stahl |
| 4,832,998 A | 5/1989 | Cyron |
| 4,844,837 A | 7/1989 | Heck et al. |
| 4,923,109 A | 5/1990 | Cyron |
| 5,004,592 A | 4/1991 | Pinto |
| 5,039,510 A | 8/1991 | Pinto |
| 5,105,539 A | 4/1992 | Maus |
| 5,135,794 A | 8/1992 | Maus |
| 5,139,844 A | 8/1992 | Maus |
| 5,300,275 A | 4/1994 | Lywood |
| 5,342,588 A | 8/1994 | Humpolik |
| 5,676,911 A | 10/1997 | Baumert et al. |
| 5,925,328 A | 7/1999 | Stahl |
| 5,932,141 A | 8/1999 | Rostrop-Nielsen |
| 6,077,459 A | 6/2000 | Laursen |
| 6,274,113 B1 | 8/2001 | Heyse |
| 6,319,877 B1 | 11/2001 | Christensen |
| 6,482,375 B1 | 11/2002 | van der Wal |

(Continued)

FOREIGN PATENT DOCUMENTS

WO    WO 00/05168 A1    2/2000

*Primary Examiner*—Walter D Griffin
*Assistant Examiner*—Huy-Tram Nguyen
(74) *Attorney, Agent, or Firm*—Pearne & Gordon LLP

(57) ABSTRACT

A catalytic reactor or heat exchanger includes a monolith defining a plurality of leaves, the monolith having a generally annular cross-section. The monolith is disposed within a generally cylindrical outer tube, and around a corrugated inner tube. The reactor includes a device for urging the monolith radially outward, so as to maintain contact between the monolith and the outer tube. Such device may include a coned washer, or it may be defined by a folded flap that is integral with the inner tube. In either case, the reactor compensates for metal creep, and virtually insures continued contact between the monolith and the outer tube.

17 Claims, 3 Drawing Sheets

U.S. PATENT DOCUMENTS

| | | |
|---|---|---|
| 6,576,158 B1 | 6/2003 | Christensen |
| 6,746,624 B1 | 6/2004 | Christensen |
| 2003/0044331 A1 | 3/2003 | DeBellis et al. |
| 2005/0061493 A1 | 3/2005 | Holtzapple |

REACTOR HAVING IMPROVED HEAT TRANSFER

BACKGROUND OF THE INVENTION

This invention relates to the field of surface catalytic reactions and/or heat exchange. The present invention provides a reactor which fits within a cylindrical outer tube, and which effectively transfers heat from the exterior of the outer tube to the reactor, or from the reactor to the outer tube.

The reactor of the present invention achieves the same objectives as those of the catalyst supports described in copending U.S. patent application Ser. No. 11/132,691, filed May 19, 2005, Ser. No. 10/896,302, filed Jul. 21, 2004, and Ser. No. 11/105,973, filed Apr. 14, 2005. The disclosures of the above-mentioned applications are incorporated by reference herein.

One of the objectives of the reactors described in the above-cited applications is to avoid the problems associated with the use of ceramic materials in the manufacture and operation of catalytic reactors. Packed bed ceramic catalysts have the disadvantage that they have low thermal conductivity, making it difficult to transfer heat from the periphery of the reactor to the inside, or vice versa. Also, the thermal mismatch between the metal and ceramic portions of prior art reactors eventually leads to pulverization of the ceramic material, thus limiting the useful life of the reactor. Like the devices described in the above-cited applications, the present invention also comprises an all-metal structure which inherently avoids these problems.

A reactor having radial leaves, as described in application Ser. No. 11/132,691, has shown good heat transfer, and therefore good overall performance, not only when simulated in a computer model, but also when evaluated as a prototype in a heat transfer rig. However, the prototype has proved quite difficult to build, and is not believed to be an optimum solution, from the standpoint of ease of manufacture.

The reactors shown in the above-cited applications, and others reactors of the prior art, occupy substantially all of the space within a cylindrical outer tube. An inherent problem with reactors of this kind is that they do not perform particularly well near the center of the reactor. It has been found that most of the catalytic reactions occur near the outer portions of the reactor, i.e. near the outer tube. This problem reduces the efficiency of the reactor, and makes it very difficult or impossible to achieve the desired level of conversion.

The present invention provides a reactor structure which solves the above problem. The reactor of the present invention is substantially more efficient than reactors of the prior art, and is also relatively easy to manufacture.

Another problem encountered with reactors installed in cylindrical tubes is that of metallic creep. The reactors described in the above-cited applications, as well as the reactor of the present invention, are intended to be stuffed into a large metallic outer tube and operated at high temperatures (in the range of 850-900° C.) and high pressures (in the range of 20-30 bar). The pressure creates a large hoop stress, which the tube material has difficulty resisting at the high temperature. Over a period of years, creep in the metal outer tube causes the diameter of the tube to grow. Even a few millimeters of growth in the tube diameter creates an undesirable gap between the reactor and the surrounding tube. A typical reactor which has been stuffed into a new tube, such that the reactor is initially in good contact with the tube, will lose contact with the tube when the tube creeps over the years. Such creep will cause a significant drop in performance.

The present invention provides structure which avoids the above problem. The invention includes a device that continuously compensates for creep, insuring proper contact between the reactor and the surrounding outer tube.

The reactor of the present invention can be used, for example, in the field of catalytic fuel reforming, to make hydrogen, which is then used to generate electricity through a fuel cell, or in other industrial processes such as oil and gas refining, ammonia and fertilizer production, hydrogenation of oils and chemicals, and iron ore reduction. The reactor could be used as a catalytic or non-catalytic combustor, or as a simple heat exchanger.

SUMMARY OF THE INVENTION

In one embodiment, the reactor of the present invention comprises a monolith made of a plurality of metallic leaves, the leaves defining a generally annular cross-section, as viewed in the direction of the flow of gas through the reactor. The reactor is held between a generally cylindrical tube, on the outside, and an expandable corrugated tube on the inside. The annular cross-section inherently insures that reactions or heat exchange occur only in a region near the inner surface of the outer tube, and not near its central axis. Conducting the reactions or heat exchange in the annular region has been found to be more efficient than attempting to conduct reactions throughout the volume of a cylindrical reactor.

The leaves are preferably formed of a metal foil, the foil being folded back and forth upon itself to define the leaves which provide surfaces on which catalytic reactions or heat exchange can occur.

In another aspect of the invention, the reactor includes means for urging the monolith radially outward, so that at least some, and preferably most, of the leaves of the monolith remain in contact with the outer tube. This structure compensates for the metal creep which causes the outer tube to expand over time and creates an undesirable gap between the monolith and the tube.

One preferred structure for the urging means is a plurality of coned washers, connected to the inner corrugated tube, near the top and bottom portions of each monolith, and engaging a groove, or equivalent structure, in a central post of the reactor. When the outer tube is oriented vertically, the weight of the monoliths, and the pressure drop caused by downward flow through the reactor, cause the washers to become slightly distorted, so that the washers exert more radial, outward force. Thus, to the extent that a gap might form between the outer tube and the monolith, the washers automatically push the leaves of the monolith radially outward, so that no gap actually forms. In other words, the structure of the present invention is effectively self-correcting. The corrugated structure of the inner tube insures that the inner tube can expand when pushed by the washers.

The function of the coned washers could instead be performed by a corrugated metallic flap. This flap is integral with the inner corrugated tube, and is folded inward relative to the main body of that tube. The corrugated flap presents itself as a corrugated, conical form that expands radially under gravitational forces at high temperature and pressure.

The present invention therefore has the primary object of providing a metallic catalytic reactor or heat exchanger.

The invention has the further object of enhancing the efficiency of a catalytic reactor or heat exchanger, by providing a reactor monolith having an annular cross-section.

The invention has the further object of providing a catalytic reactor or heat exchanger which is relatively easy to manufacture.

The invention has the further object of preventing the formation of a gap between a reactor or heat exchanger and the outer tube which encases it.

The invention has the further object of prolonging the useful life of a catalytic reactor or heat exchanger.

The invention has the further object of providing an efficient, all-metal reactor which is easy to manufacture.

The reader skilled in the art will recognize other objects and advantages of the invention, from a reading of the following brief description of the drawings, the detailed description of the invention, and the appended claims.

DETAILED DESCRIPTION OF THE INVENTION

The reactor of the present invention comprises a catalyst support, preferably made of metal foil, the metal foil comprising a plurality of leaves or fins which define a relatively large surface area for catalytic combustion or heat exchange. In a preferred embodiment, the leaves are formed by folding the metal foil back and forth upon itself to define a monolith. The terms "leaves" and "fins" are used interchangeably in this specification. If the monolith is used for catalytic reactions, its surfaces are coated with a suitable catalyst.

In one aspect of the invention, the reactor has the form of an annulus. That is, the reactor comprises a strip of metal foil that has been folded back and forth upon itself many times, but wherein the folded strip defines a generally annular cross-section, as viewed in the direction of the flow of gas through the reactor. The reactor is inserted within a cylindrical outer tube, the other side of the reactor being bounded by an expandable corrugated inner tube. Thus, the reactor occupies the space that is generally adjacent the inner surface of the outer tube, without occupying the space near the central axis of the outer tube. The advantage of this annular structure is that the leaves of the reactor are all located in a region that is closest to the outer tube. Thus, heat from outside the outer tube is transferred easily to substantially the entire reactor. Unlike the case of the prior art, it is no longer necessary to insure that heat from the outside will penetrate all of the volume bounded by the outer tube. The inner tube prevents gas entering the reactor from flowing into the central region of the structure.

The above concept was first tested by a computer model, in which the leaves of the reactor were located only in an annulus defined by an inner diameter of three inches and an outer diameter of four inches. The latter figures are given by way of example, and should not be deemed to limit the scope of the invention. In the above example, the leaves occupied a cross-sectional area that was about 43.75% of the total cross-section of the outer tube. A small improvement in performance was expected, but the improvement that was actually obtained was unexpectedly large. In particular, with a conventional reactor, it was difficult or impossible to achieve 98% conversion using representative feed conditions on a 40-foot long tube. But with the above-described annular structure, it was easy to achieve conversions of 99% or more, for a range of geometric parameters.

Figure 1:
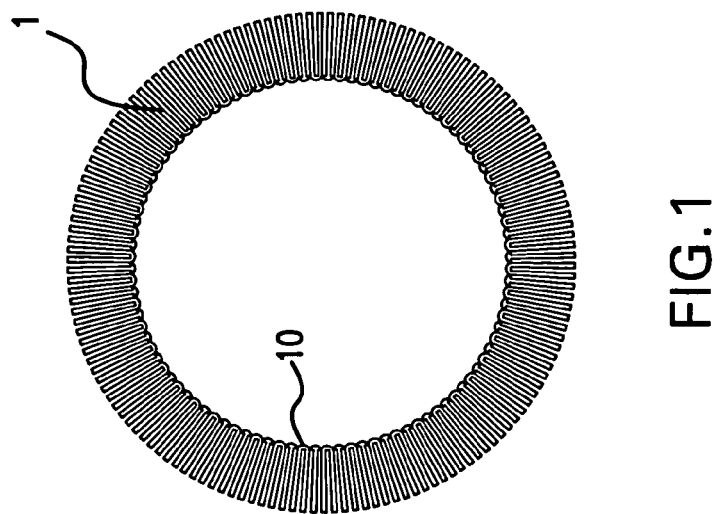
FIG. 1 provides an end view of the annular monolith, and its associated inner corrugated tube, forming an essential element of a reactor made according to the present invention.

The basic structure of the reactor of the present invention is shown in FIG. 1. As shown in the figure, annular monolith 1 is formed of a strip of metal foil that has been folded back and forth upon itself. The folds of the foil comprise the fins or leaves, and comprise the means for heat exchange. The folded foil is commercially available from Robinson Fin Machines, Inc. of Kenton, Ohio. Thus, one can simply obtain a previously folded foil, and form the folded foil into an annulus, as shown. The monolith is bounded, on the inside, by an expandable, corrugated inner tube 10. The entire reactor is encased within an outer tube (not shown in FIG. 1 or 2).

Figure 3:
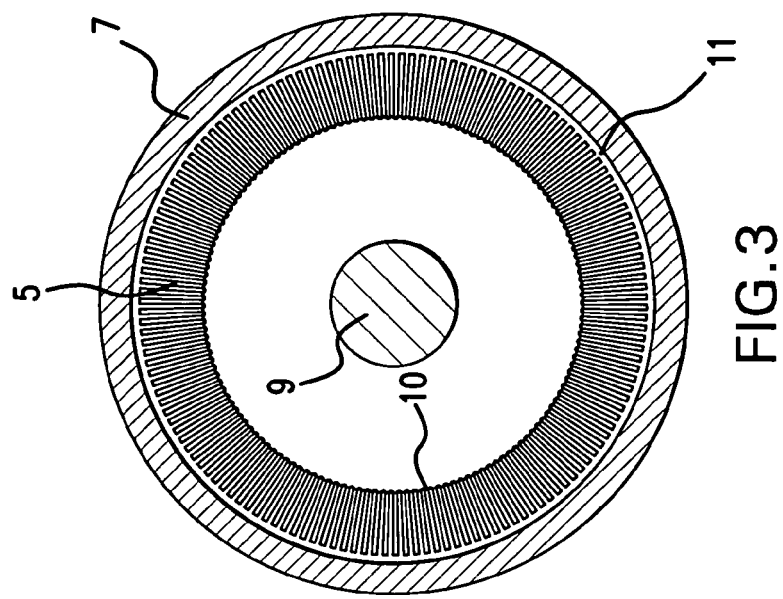
FIG. 3 provides a cross-sectional view, taken along the line 3-3 of FIG. 4, showing a reactor of the present invention as installed within an outer tube.
Figure 2:
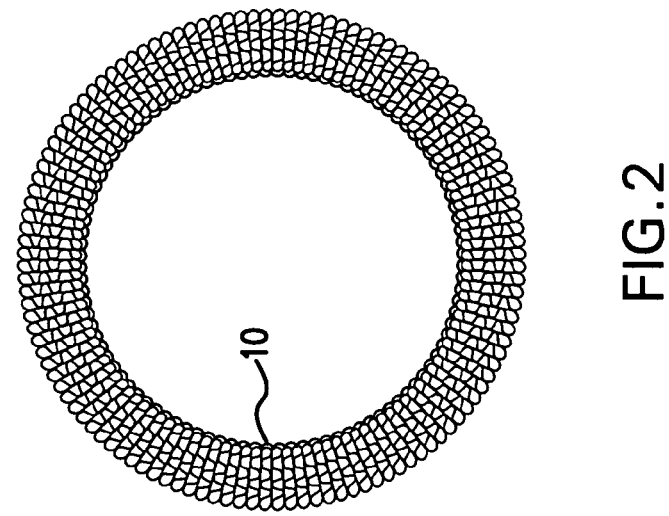
FIG. 2 provides a view similar to that of FIG. 1, in which the strip used to form the reactor is corrugated and uncorrugated in selected locations.

The flow of gas, in FIGS. 1-3, is perpendicular to the paper, and therefore generally parallel to the surfaces of the leaves or fins. The coned washers block flow to the central region and insure that gas flows through the annular region only. The inner tube assures that gas entering the annular region will not flow into the unoccupied central region.

The foil of FIG. 1 may be either plain or ruffled. A ruffled piece of foil, also available from Robinson Fin Machines, Inc., has waves formed in each layer. That is, each layer of foil defines a leaf or fin, and each fin has a height which varies along the length of the fin. FIG. 1 is intended to include the cases of both a plain and a ruffled fin. The ruffled fin is likely to offer an incremental benefit in performance relative to that of the plain fin.

FIG. 2 shows another embodiment, similar to FIG. 1, in which the foil includes flat (uncorrugated) portions alternating with corrugated portions. When the foil is folded back and forth upon itself, each flat portion is sandwiched between adjacent corrugated portions, so the flat portions prevent the corrugated portions from nesting together. The inner corrugated tube 10 is the same as that of FIG. 1. A prototype reactor using the arrangement of FIG. 2 was tested, and was found to provide better heat transfer than that achieved by reactors of the prior art, as represented by the above-cited applications.

The invention should not be deemed limited to the specific structures of the leaves or fins shown in FIGS. 1 and 2. The invention is intended to include other fin structures, provided that the cross-section of the reactor is annular.

FIG. 3 shows a reactor, formed with monolith 5, preferably formed of a metal foil, similar to that of FIG. 1, inserted within outer tube 7, and around inner tube 10. A mandrel or post 9 is located at the central axis of the cylindrical structure. The reactor defines an annular cross-section, and this annulus is positioned adjacent the inner surface of the tube 7 as shown. The monolith could alternatively have the structure of FIG. 2, or any other structure which can be arranged in an annular cross-section.

In addition to the increase in performance achieved because of the annular structure, the reactor of the present invention has the further advantage that it more readily expands or contracts in the radial direction. The relatively large unused area in the center of the reactor provides space within which to house components for assisting the expansion or contraction, as will be explained later.

As noted earlier, creep in the metal defining the outer tube causes the diameter of that tube to grow over time. Such creep causes a gap to form between the foil of the monolith and the outer tube, as illustrated by gap 11 in FIG. 3. The gap is shown in the figures only for clarity of illustration. In practice, any gap is undesirable, as it inhibits heat transfer between the outer tube and the reactor. The larger the gap, the more undesirable the structure. In the ideal case, the monolith will always touch the inner surface of the outer tube.

Figure 4:
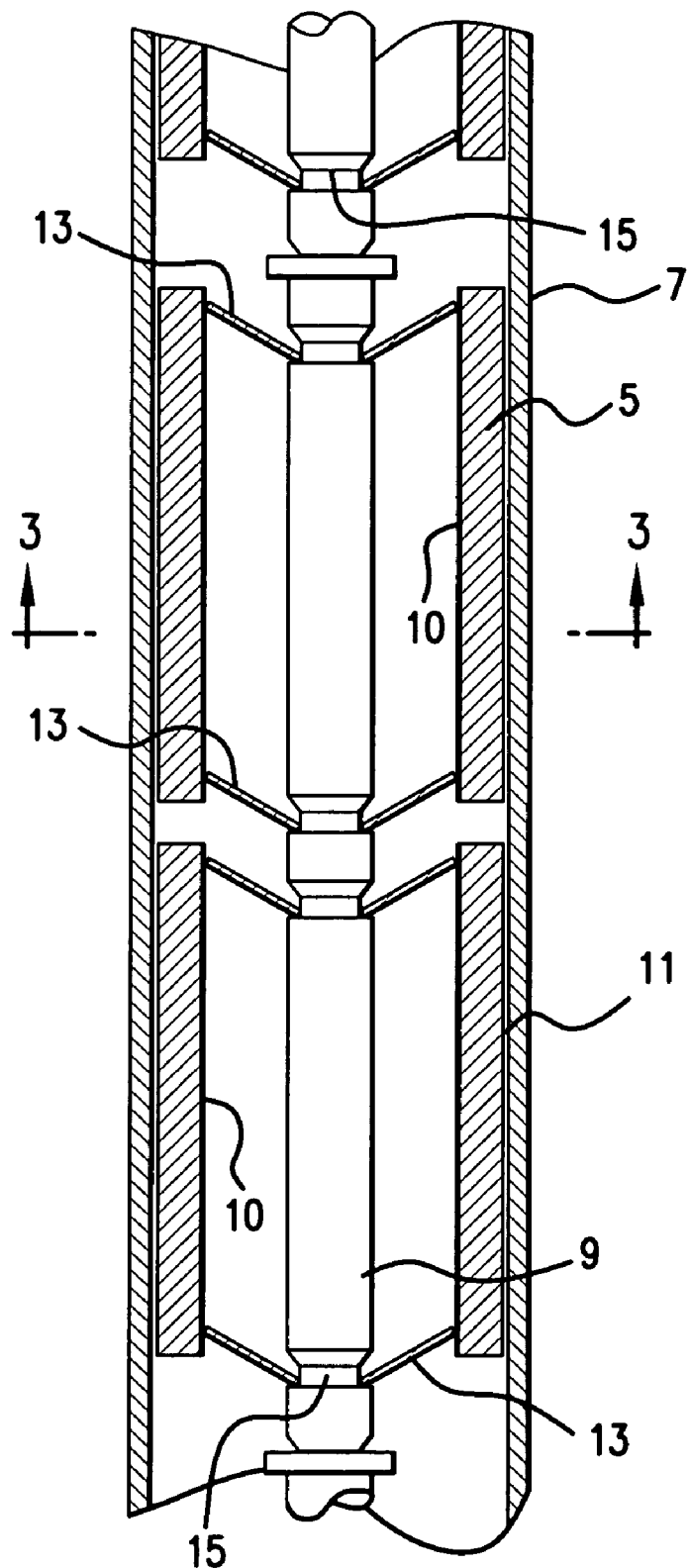
FIG. 4 provides a fragmentary cross-sectional view of the reactor of the present invention, showing the coned washers which prevent the formation of a gap between the leaves of the reactor and the outer tube.

A solution to the problem represented by the gap is shown in FIG. 4. This figure shows, in fragmentary form, a plurality of monoliths 5 stacked within tube 7. The monoliths 5 are connected to a mandrel or post 9 by coned (Bellville-type) washers 13. As shown in the figure, the coned washers engage the inner corrugated tube 10, in the vicinity of the top and bottom portions of each reactor, and rest in grooves 15 formed in the mandrel or post 9. The mandrel supports the weight of the assembly.

As the outer tube 7 grows away from the fins, due to creep in the metal, a gap 11 is created. The weight of the monoliths, the expanding outer tube, and the coned washers, plus the pressure drop from the downward flow of gas, together act to distort the relatively weak coned washers to a more shallow angle, relative to the horizontal. When the washers are forced to be more nearly horizontal, they expand the inner tube 10, pushing the leaves of the monolith radially outward so that they remain in contact with the outer tube. Thus, the washers comprise means for urging the leaves radially outward, so as to maintain contact between the leaves and the outer tube.

Thus, in the present invention, there is virtually no chance for a gap, such as gap 11, to form at all. To the extent that a gap forms momentarily, the weight of the monoliths exerts downward force on the washers, forcing them into a more horizontal orientation, and pushing the monoliths radially outwardly, so as to contact the outer tube. The corrugated nature of the inner tube 10 insures that the inner tube can expand when so pushed. The structure is therefore inherently self-correcting, as long as the coned washers are oblique relative to the horizontal.

The mandrel 9 functions as a center post which acts to support the entire system. At the extreme bottom of the system, a suitable stool or shelf (not shown) must be provided to support the post. Thereafter, each post of a given section rests on the post of the section below. FIG. 4 shows only two complete reactors, which are typically about six inches long, but in practice, there may be many more, of the order of ten or more. A handle or similar structure (not shown) may be placed on top of the post of each section to enable grasping of the same during installation and removal.

The post in FIG. 4 is shown as a machined part. It is likely less expensive to make the post from an unmachined center post, surrounded by short tube sections which would perform the functions of the grooves. In this case, the inner diameter of such a tube section (not shown) would be just slightly larger than the outer diameter of the post.

The coned washer 13 must be properly designed with an appropriate thickness, geometry, and material to give the correct response to the weight of the parts, while still maintaining its integrity. The washer may be a true stamped (or spun) coned washer in the conventional sense, or it may be made from a corrugated material.

Figure 6:
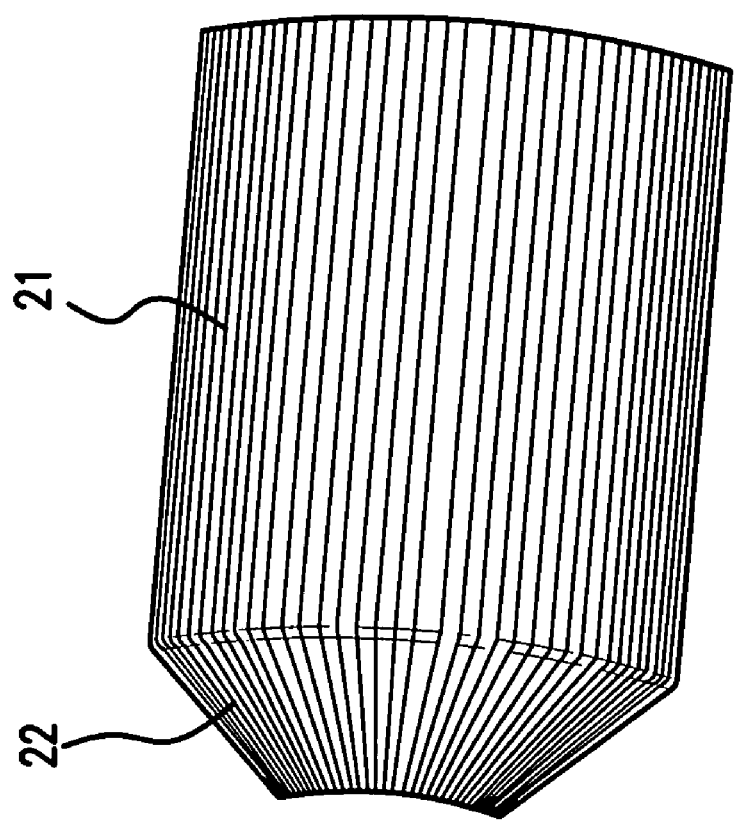
FIGS. 5 and 6 provide perspective views of an alternative embodiment, wherein the inner corrugated tube of the present invention is integrally formed with flaps which perform the same function as the coned washers.
Figure 5:
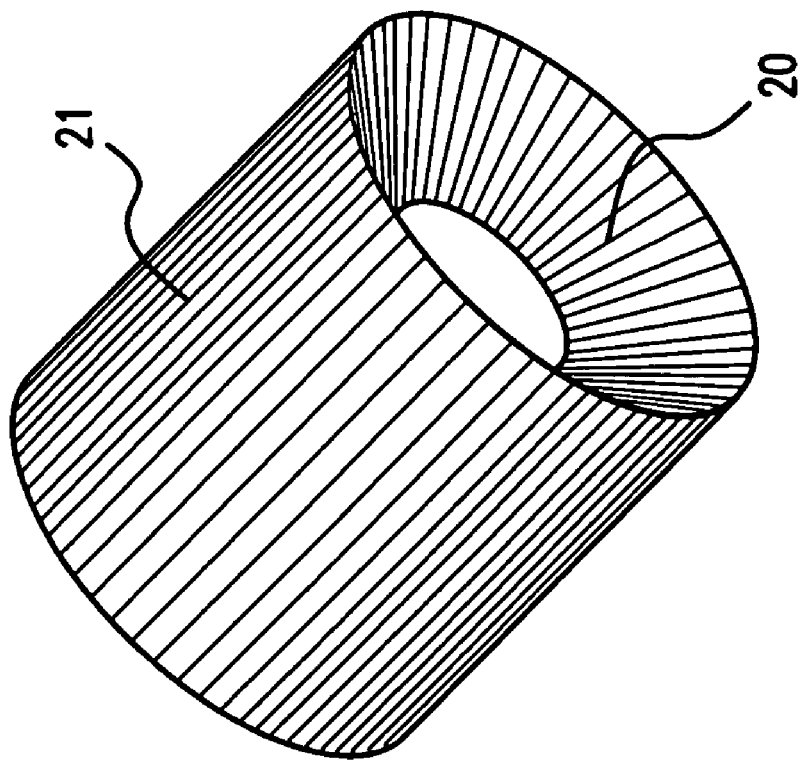

An alternative arrangement is shown in FIGS. 5 and 6. In this embodiment, the inner corrugated tube 21 and the coned washers are made from one piece of corrugated material. The corrugated metal is bent "across the grain" to form washer flaps designated by reference numerals 20 and 22. The extreme edges are crimped and gathered, which pulls the metal into a cylindrical shape. The part is then finished by spot welding the ends that have been brought together. In this embodiment, the flaps 20 and 22 function in substantially the same way as the washers shown in FIG. 4. The flaps therefore comprise corrugated, conical forms that expand radially under gravitational forces at high temperature and pressure.

The metal used to make the inner corrugated tube is preferably a foil, similar to that used for the monolith.

The invention can be modified in various ways, within the scope of the above disclosure. For example, the configuration of the foil used to make the reactor can be changed. The arrangement of the coned washers can be varied. Other means for urging the leaves of the reactor against the tube could be used instead of the coned washers. The dimensions of the monoliths could be varied, as could the number of monoliths inserted within the outer tube. These and other modifications, which will be apparent to the reader skilled in the art, should be considered within the spirit and scope of the following claims.

What is claimed is:

1. A reactor comprising a plurality of metallic leaves, the leaves having surfaces, the reactor defining a plurality of paths for gas flow, the paths being generally parallel to the surfaces of the leaves, the leaves defining a generally annular cross-section as viewed in a direction of said paths for gas flow, wherein the leaves are inserted between an outer metallic tube and an inner tube, and wherein the leaves occupy an annular space between the outer tube and the inner tube, the reactor further comprising means for urging the leaves radially outward so that some of the leaves are in contact with the outer tube.

2. The reactor of claim 1, wherein the urging means comprise a coned washer positioned to push against the inner tube.

3. The reactor of claim 2, wherein the reactor includes an axial post, and wherein the washer engages a groove formed in the post.

4. The reactor of claim 1, wherein the inner tube is integrally formed with a folded flap, and wherein the urging means comprises said flap.

5. A reactor comprising: a) a generally cylindrical outer tube, and a generally cylindrical inner tube, b) a monolith including a plurality of leaves, the monolith having an annular cross-section and being disposed between the outer tube and the inner tube, and c) means for urging the leaves radially outward, so as to maintain contact between the leaves and the outer tube.

6. The reactor of claim 5, further comprising a post disposed along a longitudinal axis of the inner tube, the post having at least one groove, and wherein the urging means are in engagement with said groove.

7. The reactor of claim 5, wherein the urging means comprise a coned washer positioned to push against the inner tube.

8. The reactor of claim 5, wherein the inner tube is integrally formed with a folded flap, and wherein the urging means comprises said flap.

9. The reactor of claim 7, wherein there are at least two coned washers engaging the inner tube, in a vicinity of a top and bottom portion of the monolith.

10. A reactor comprising: a) a generally cylindrical outer tube, and b) a monolith including a plurality of leaves, the monolith having an annular cross-section and being disposed within the outer tube and in a vicinity of an inner surface of the outer tube, the reactor further comprising a corrugated inner tube, the monolith being located between the inner tube and the outer tube.

11. The reactor of claim 10, the reactor further comprising means for urging the leaves radially outward, so as to maintain contact between the leaves and the outer tube.

12. A reactor comprising: a) a generally cylindrical outer tube, and b) a monolith including a plurality of leaves, the monolith having an annular cross-section and being disposed within the outer tube and in a vicinity of an inner surface of the outer tube, the reactor further comprising a post disposed along a longitudinal axis of the outer tube.

13. The reactor of claim 12, wherein there is a space between the monolith and the post.

14. A reactor comprising: a) a generally cylindrical outer tube, and b) a monolith including a plurality of leaves, the monolith having an annular cross-section and being disposed within the outer tube and in a vicinity of an inner surface of the outer tube, the reactor further comprising means for urging the leaves radially outward, so as to maintain contact between the leaves and the outer tube.

15. The reactor of claim 14, wherein the urging means comprise a coned washer positioned to urge the leaves radially outward.

16. The reactor of claim 14, further comprising an inner tube integrally formed with a folded flap, and wherein the urging means comprises said flap.

17. The reactor of claim 15, wherein there are at least two coned washers in a vicinity of a top and bottom portion of the monolith.

\* \* \* \* \*